(12) United States Patent
Yamaguchi

(10) Patent No.: US 6,901,816 B2
(45) Date of Patent: Jun. 7, 2005

(54) APPARATUS AND METHOD FOR DETECTING ABSOLUTE POSITION USING DIFFERENCE BETWEEN DETECTION SIGNALS OF TWO DETECTORS

(75) Inventor: Shigetoshi Yamaguchi, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 223 days.

(21) Appl. No.: 10/233,495

(22) Filed: Sep. 4, 2002

(65) Prior Publication Data

US 2003/0046012 A1 Mar. 6, 2003

(30) Foreign Application Priority Data

Sep. 5, 2001 (JP) ........................................ 2001-268388

(51) Int. Cl.$^7$ .............................................. G01L 3/02
(52) U.S. Cl. .................................................. 73/862.326
(58) Field of Search ...................... 73/862.326, 862.08, 73/862.11, 862.325, 862.328, 862.193

(56) References Cited

U.S. PATENT DOCUMENTS

| | | | | |
|---|---|---|---|---|
| 4,621,327 A | * | 11/1986 | Dolph et al. ................ 701/43 |
| 5,239,490 A | * | 8/1993 | Masaki et al. ............... 702/41 |
| 5,259,473 A | * | 11/1993 | Nishimoto ................. 180/446 |
| 5,271,474 A | * | 12/1993 | Nishimoto et al. ......... 180/446 |
| 5,465,210 A | | 11/1995 | Walenty |
| 5,930,905 A | | 8/1999 | Zabler et al. |
| 2002/0024336 A1 | | 2/2002 | Desbiolles et al. |

FOREIGN PATENT DOCUMENTS

| | | |
|---|---|---|
| DE | 41 42 457 | 6/1993 |
| DE | 42 36 483 | 5/1994 |
| DE | 195 06 938 | 8/1996 |
| DE | 199 41 101 | 3/2001 |
| EP | 1 167 927 | 1/2002 |
| JP | 10-170357 | 6/1998 |

* cited by examiner

*Primary Examiner*—Max Noon
(74) *Attorney, Agent, or Firm*—Oblon, Spivak, McClelland, Maier & Neustadt, P.C.

(57) ABSTRACT

A power steering apparatus includes a motor, a torque sensor, and a motor resolver. The motor generates an assisting force to reduce the steering force of the steering wheel. The torque sensor detects the steering torque of the steering wheel. The motor resolver detects the rotational angle of the motor. An electronic control unit (ECU) detects the absolute position of the steering wheel based on a detection signal Rt sent from a second resolver of the torque sensor and a detection signal Rm sent from a motor resolver. As a result, the cost is reduced and the absolute position of the steering wheel is accurately detected.

8 Claims, 6 Drawing Sheets

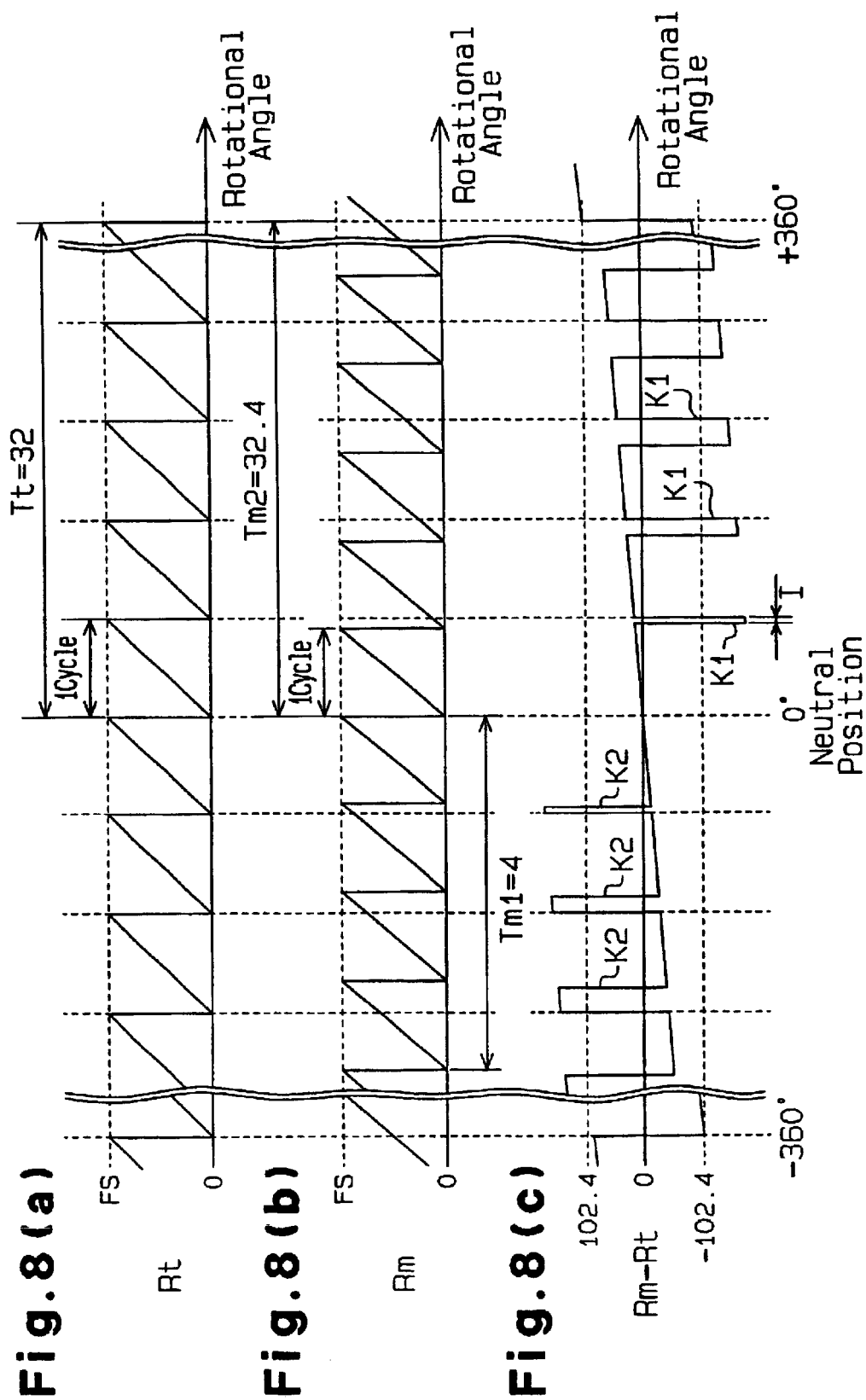

APPARATUS AND METHOD FOR DETECTING ABSOLUTE POSITION USING DIFFERENCE BETWEEN DETECTION SIGNALS OF TWO DETECTORS

BACKGROUND OF THE INVENTION

The present invention relates to an apparatus and a method for detecting the absolute position of a rotary body such as a steering wheel.

An electric power steering apparatus, in which steering is assisted by an electric motor, has recently been proposed to reduce the steering force of a steering wheel of a vehicle. In controlling the electric power steering apparatus, it is required to determine the absolute position (absolute steering angle) of the steering wheel. The steering wheel is rotated within the finite rotation number, which is more than or equal to one rotation. The absolute position of the steering wheel is the angle by which the steering wheel is rotated from the neutral position. The neutral position is the position of the steering wheel at which the vehicle travels in a straight line.

A steering sensor is used as a sensor for detecting the absolute position of a steering wheel. The steering sensor includes a slit plate and three sets of photo interrupters. The slit plate has several slits and is arranged on the steering wheel to rotate integrally with the steering wheel. The photo interrupters are secured to a steering column. Each set of photo interrupter includes a light emitting diode and a photodetector, which face each other. The slit plate, which is inserted between the light emitting diode and the photodetector, is rotated so that the beam between the light emitting diode and the photodetector is selectively blocked and unblocked. Accordingly, the photodetector sends out signals.

Two sets of photo interrupters detect the number of rotation and the rotational direction of the slit plate. The remaining one set of photo interrupters detects the neutral position (reference position) of the steering wheel in one rotation. Output signals are, for example, sent to a control unit such as an electronic control unit (ECU) mounted on a vehicle.

The steering wheel can generally be rotated more than one rotation (360 degrees). The steering wheel is, for example, rotated two rotations (720 degrees) to the left and two rotations (720 degrees) to the right starting from the neutral position. Thus, even when a signal representing the neutral position is sent from one set of photo interrupter used for detecting the reference position, it is not clear how many times the steering wheel has been rotated. Therefore, it is impossible to detect an accurate absolute position of the steering wheel only by using the detection signals from the steering sensor.

Also, the accurate absolute position of the steering wheel cannot be detected immediately after an ignition switch is turned on. When a vehicle starts traveling and one set of photo interrupters detects the neutral position, the control unit detects the number of rotation and the rotational direction of the steering wheel from the neutral position based on the output signal from the first set of photo interrupter and the output signals from the other two sets of photo interrupters. However, the neutral position detected immediately after the ignition switch is turned on does not show how many times the steering wheel has been rotated. Thus, the accurate absolute position is detected based on output signals from the three sets of photo interrupters, and the detection signals from the vehicle speed sensor and the yaw rate sensor after the vehicle travels further. The control unit of the vehicle, which uses the absolute position as a parameter, is operated based on the detected absolute position.

It is desired to reduce the cost for detecting the absolute position of the steering wheel. However, the steering sensor that has the above mentioned complicated structure must be used for detecting the absolute position of the steering wheel. The above described prior art steering sensor requires the vehicle to travel a certain distance from when the ignition switch is turned on until the sensor detects the accurate absolute position. Thus, the steering sensor cannot detect the absolute position in earlier stage.

The electric motor located in the electric power steering apparatus includes a motor resolver, which detects the rotational angle of the motor. The electric power steering apparatus includes a torque sensor, which has a resolver for detecting the steering torque of the steering wheel. The motor resolver and the torque sensor send resolver signals, or rotational angle signals. Thus, it is considered that detection of the absolute position using these signals will reduce the cost. However, even when the absolute position is detected using the resolver signals from the motor resolver, it is difficult to specify the absolute position of the steering wheel since the position of the rotor is specified by the electrical degree within one cycle only.

The resolver, which is located in the torque sensor, detects the torsion of a torsion bar. The torsion bar is incorporated in a pinion shaft, which is coupled to the steering wheel. However, since several signals are sent out in one rotation of the steering wheel, it is not clear what signal number from the neutral position of the steering wheel is detected.

Therefore, the absolute position of the steering wheel cannot be detected using the signals sent from each resolver independently.

SUMMARY OF THE INVENTION

Accordingly, it is an objective of the present invention to provide an apparatus and a method for accurately detecting the absolute position of the steering wheel at low cost.

To achieve the above objective, the present invention provides an apparatus for detecting the absolute rotational position of a steering wheel. The steering wheel is coupled to a power steering apparatus. The power steering apparatus has a motor, which generates an assisting force to reduce the steering force of the steering wheel. The motor is controlled in accordance with the steering torque of the steering wheel and the rotational angle of the motor. The detecting apparatus includes a first detector, a second detector, and a computer. The first detector generates a periodic first detection signal in accordance with rotation of the steering wheel. The first detection signal is used for detecting the steering torque of the steering wheel. The second detector generates a periodic second detection signal in accordance with rotation of the motor. The second detection signal is used for detecting the rotational angle of the motor. The cycle of the second detection signal differs from the cycle of the first detection signal. A level difference, which is the difference between the level of the first detection signal and the level of the second detection signal, varies in accordance with rotation of the steering wheel. The computer in advance stores characteristic information regarding the variation of the level difference, which varies in accordance with rotation of the steering wheel. The computer calculates the absolute rotational position of the steering wheel based on the current level difference and the characteristic information.

The present invention also provides a method for detecting the absolute rotational position of a steering wheel. The steering wheel is coupled to a power steering apparatus. The power steering apparatus has a motor, which generates an assisting force to reduce the steering force of the steering wheel. The motor is controlled in accordance with the steering torque of the steering wheel and the rotational angle of the motor. The method includes: generating a periodic first detection signal in accordance with rotation of the steering wheel, wherein the first detection signal is used for detecting the steering torque of the steering wheel; generating a periodic second detection signal in accordance with rotation of the motor, wherein the second detection signal is used for detecting the rotational angle of the motor, wherein the cycle of the second detection signal differs from the cycle of the first detection signal, and wherein a level difference, which is the difference between the level of the first detection signal and the level of the second detection signal, varies in accordance with rotation of the steering wheel; and computing the absolute rotational position of the steering wheel based on characteristic information regarding the variation of the level difference, which varies in accordance with rotation of the steering wheel, and the current level difference.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8(a) is a time chart illustrating a waveform of detection signals sent from a second resolver located in the torque sensor shown in FIG. 2;

FIG. 8(b) is a time chart illustrating a waveform of detection signals sent from the motor resolver shown in FIG. 5; and FIG. 8(c) is a time chart illustrating difference between the detection signals sent from the second resolver in FIG. 2 and the motor resolver in FIG. 5.

DETAILED DESCRIPTION OF THE PREFERRED EMBODIMENTS

An electric power steering apparatus 11 according to a preferred embodiment of the present invention will now be described with reference to FIGS. 1 to 8(c).

Figure 1:
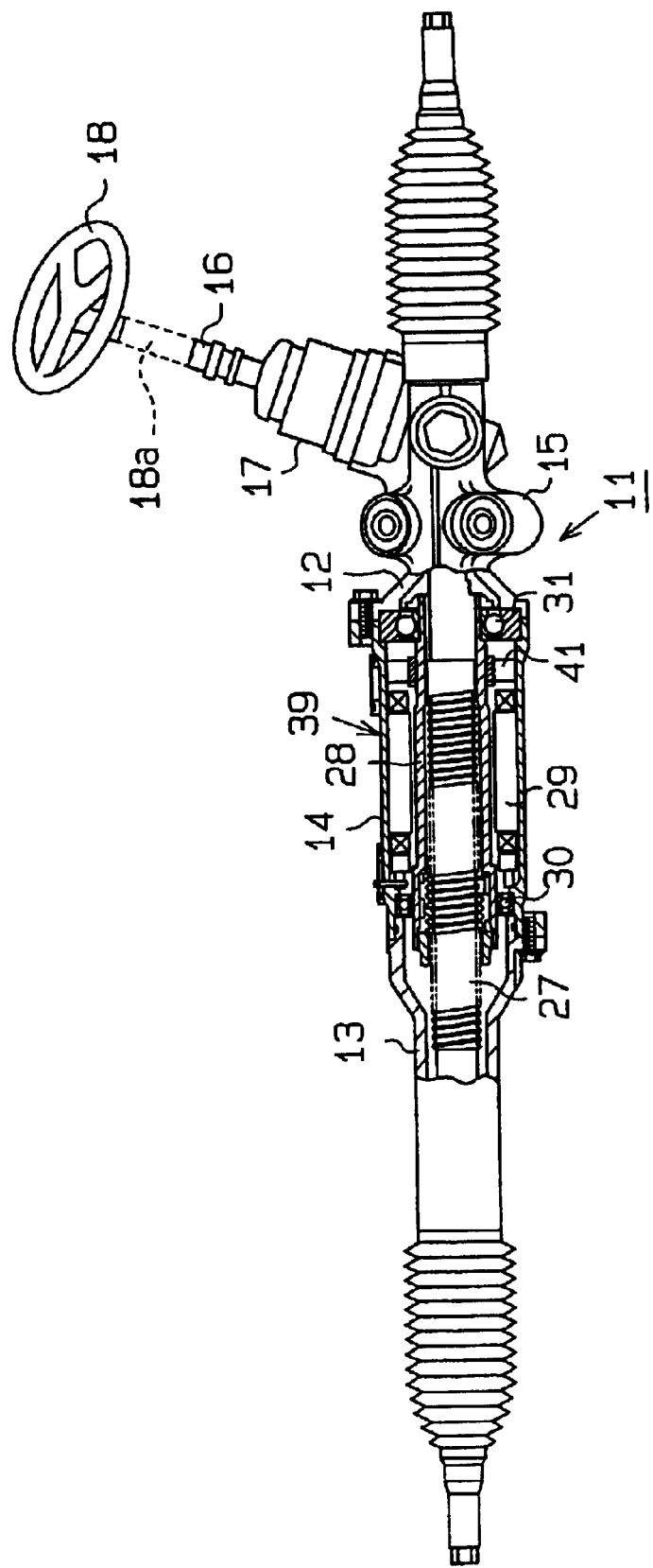
FIG. 1 is a front view, with a part cut away, illustrating an electric power steering apparatus according to a first embodiment of the present invention.

FIG. 1 shows the electric power steering apparatus 11. The electric power steering apparatus 11 includes a hollow cylindrical first rack housing 12, a hollow cylindrical second rack housing 13, and a hollow cylindrical motor housing 14, which is coaxially coupled to the first and second rack housings 12, 13. The first rack housing 12 has a mounting portion 15. The electric power steering apparatus 11 is secured to a vehicle body, which is not shown, via the mounting portion 15 using screws.

A pinion housing 17, which has a pinion shaft 16, is joined to the first rack housing 12. The pinion shaft 16 is coupled to a steering shaft 18a, which extends from a steering wheel 18. The pinion shaft 16 rotates integrally with the steering wheel 18.

Figure 2:
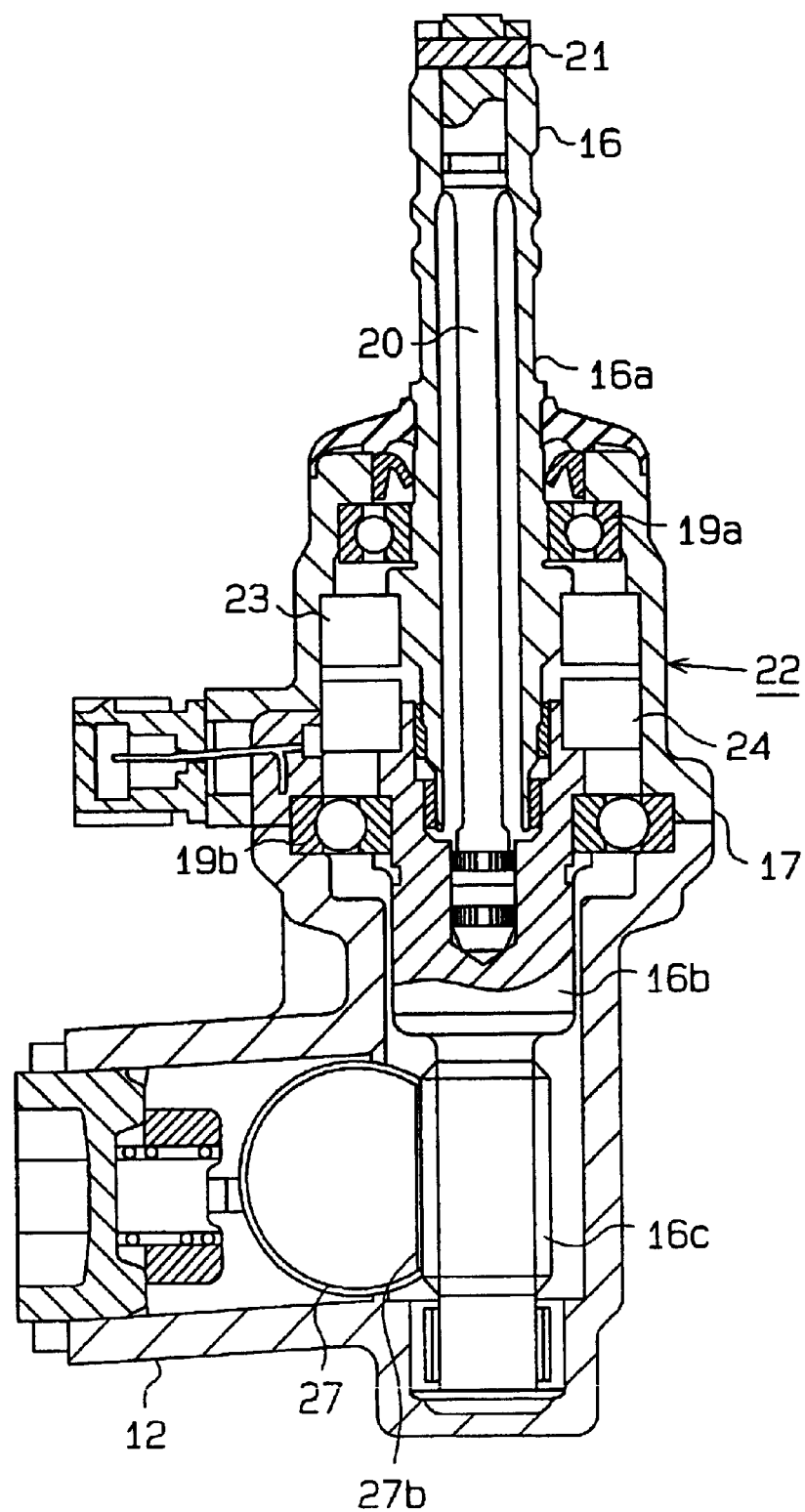
FIG. 2 is a partial cross-sectional view mainly illustrating a torque sensor located on the electric power steering apparatus shown in FIG. 1.

As shown in FIG. 2, the pinion shaft 16 has an input shaft 16a and an output shaft 16b, which are coaxial. The input shaft 16a is coupled to the steering shaft 18a and a pinion gear 16c is arranged on the output shaft 16b. The pinion shaft 16 is supported by the pinion housing 17 with bearings 19a, 19b. The pinion shaft 16 rotates relative to the pinion housing 17.

The input shaft 16a and the output shaft 16b accommodate a torsion bar 20. The input shaft 16a is coupled to the output shaft 16b by the torsion bar 20 such that the input shaft 16a rotates integrally with the output shaft 16b. A first end of the torsion bar 20 is joined with the input shaft 16a by a pin 21. A second end of the torsion bar 20 is joined with the output shaft 16b by splines. The torsion bar 20 generates elasticity in the direction of the torsion when the input shaft 16a is rotated relative to the output shaft 16b. The input shaft 16a corresponds to a first rotary shaft and the output shaft 16b corresponds to a second rotary shaft.

A torque sensor 22 is arranged about the input shaft 16a and the output shaft 16b. The torque sensor 22 has a first resolver 23, which corresponds to the input shaft 16a, and a second resolver 24, which corresponds to the output shaft 16b.

Figure 3:
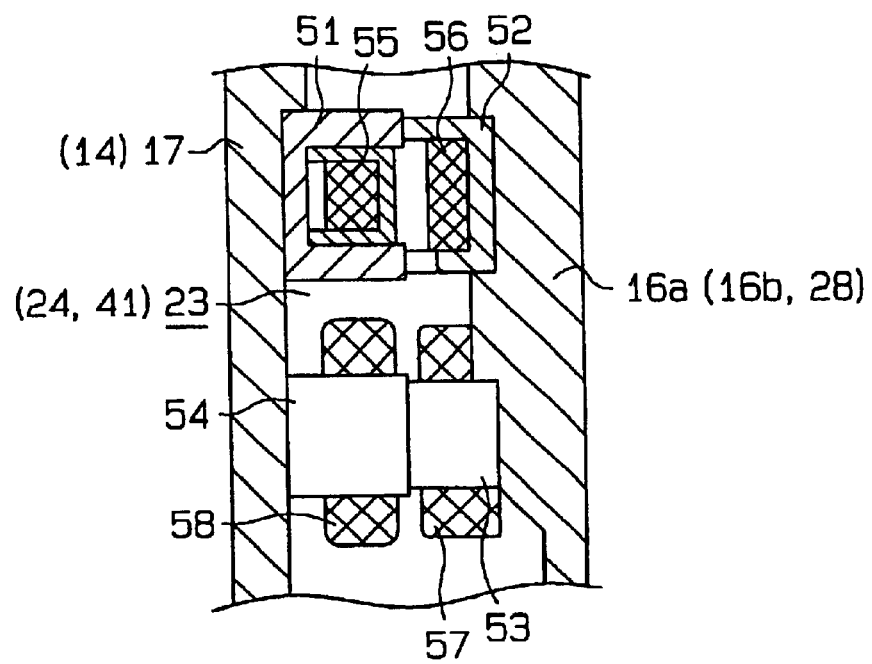
FIG. 3 is a partial cross-sectional view illustrating a first resolver located in the torque sensor shown in FIG. 2.

As shown in FIG. 3, the first resolver 23 includes a first to fourth yokes 51, 52, 53, and 54, and a first to fourth coils 55, 56, 57, and 58. The first yoke 51 is annular and formed along the inner circumference of the pinion housing 17. The first yoke 51 is secured to the pinion housing 17. The first coil 55 is wound about the first yoke 51. The second yoke 52 is annular and is secured to the outer circumference of the input shaft 16a to face the first yoke 51. The second yoke 52 rotates integrally with the input shaft 16a. The second coil 56 is wound about the second yoke 52.

Figure 4:
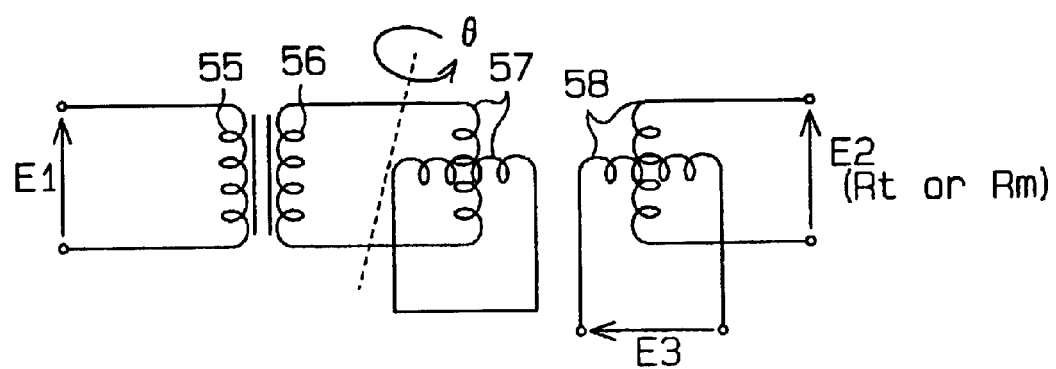
FIG. 4 is an electric circuit of the first resolver shown in FIG. 3.

The third yoke 53 is annular and is secured to the outer circumference of the input shaft 16a adjacent to the second yoke 52. The third yoke 53 rotates integrally with the input shaft 16a. The third coil 57 is wound about the third yoke 53. As shown in FIG. 4, the third coil 57 includes two types of coils, the phases of which are displaced by 90 degrees. The third coil 57 is connected to the second coil 56. The fourth yoke 54 is annular and is secured to the inner circumference of the pinion housing 17 opposite to the third yoke 53. The fourth coil 58 is wound about the fourth yoke 54. The fourth coil 58 also includes two types of coils, the phases of which are displaced by 90 degrees.

The second resolver 24 will now be described. The second resolver 24 has substantially the same structure as the first resolver 23. Therefore, only the differences from the first resolver 23 will be described with reference to FIG. 3.

Like the first resolver 23, the second resolver 24 includes first to fourth yokes 51, 52, 53, and 54, and first to fourth coils 55, 56, 57, and 58. In contrast to the first resolver 23, which is located between the pinion housing 17 and the input shaft 16a, the second resolver 24 is located between the pinion housing 17 and the output shaft 16b.

A method for detecting the steering torque using the first and the second resolvers 23, 24 will now be described with reference to FIG. 4.

When the steering wheel 18 is steered and the input shaft 16a is rotated by a rotational angle θ1, an alternating current E1 is applied to the first coil 55. A magnetic flux is generated in the first yoke 51 and the second yoke 52 in accordance with the voltage. The magnetic flux induces an alternating current in the second coil 56. Since the second coil 56 is connected to the third coil 57, the magnetic flux also induces an alternating current in the third coil 57. Since the third coil 57 includes two types of coils, the phases of which are 90 degrees displaced, two kinds of alternating currents, the phases of which are 90 degrees displaced, are induced in the third coil 57. The alternating currents generated in the third coil 57 also induce two types of alternating currents E2, E3 having different phases in the fourth coil 58, which has two types of coils. The alternating currents E2, E3 satisfy the following equations (a) and (b).

$$E2 = k \cdot E1 \times \cos\theta \quad (a)$$

$$E3 = k \cdot E1 \times \sin\theta \quad (b)$$

In the above equations, k represents the proportion of the voltage transformation. The angle θ is obtained from the above equations (a) and (b). The angle θ is the rotational angle θ1 of the input shaft 16a.

On the other hand, when the input shaft 16a is rotated as the steering wheel 18 is steered, the output shaft 16b, which is coupled to the input shaft 16a by the torsion bar 20, is also rotated. The rotational angle θ2 of the output shaft 16b is also obtained by the equations (a) and (b) based on output signals, which are the alternating currents E2, E3, from the second resolver 24, which corresponds to the output shaft 16b.

When the input shaft 16a and the output shaft 16b are rotated, the torsion bar 20 is twisted. This generates a relative rotational angle difference Δθ (θ1−θ2) between the input shaft 16a and the output shaft 16b. As a result, the steering torque is obtained from the relative rotational angle difference Δθ, which is the twist angle of the torsion bar 20, and the rigidity of the torsion bar 20.

A conventional assist control for assisting the steering force of the steering wheel 18 is performed by controlling the electric motor 39 in accordance with the steering torque. Accordingly, the steering wheel 18 is steered in a suitable manner.

Figure 5:
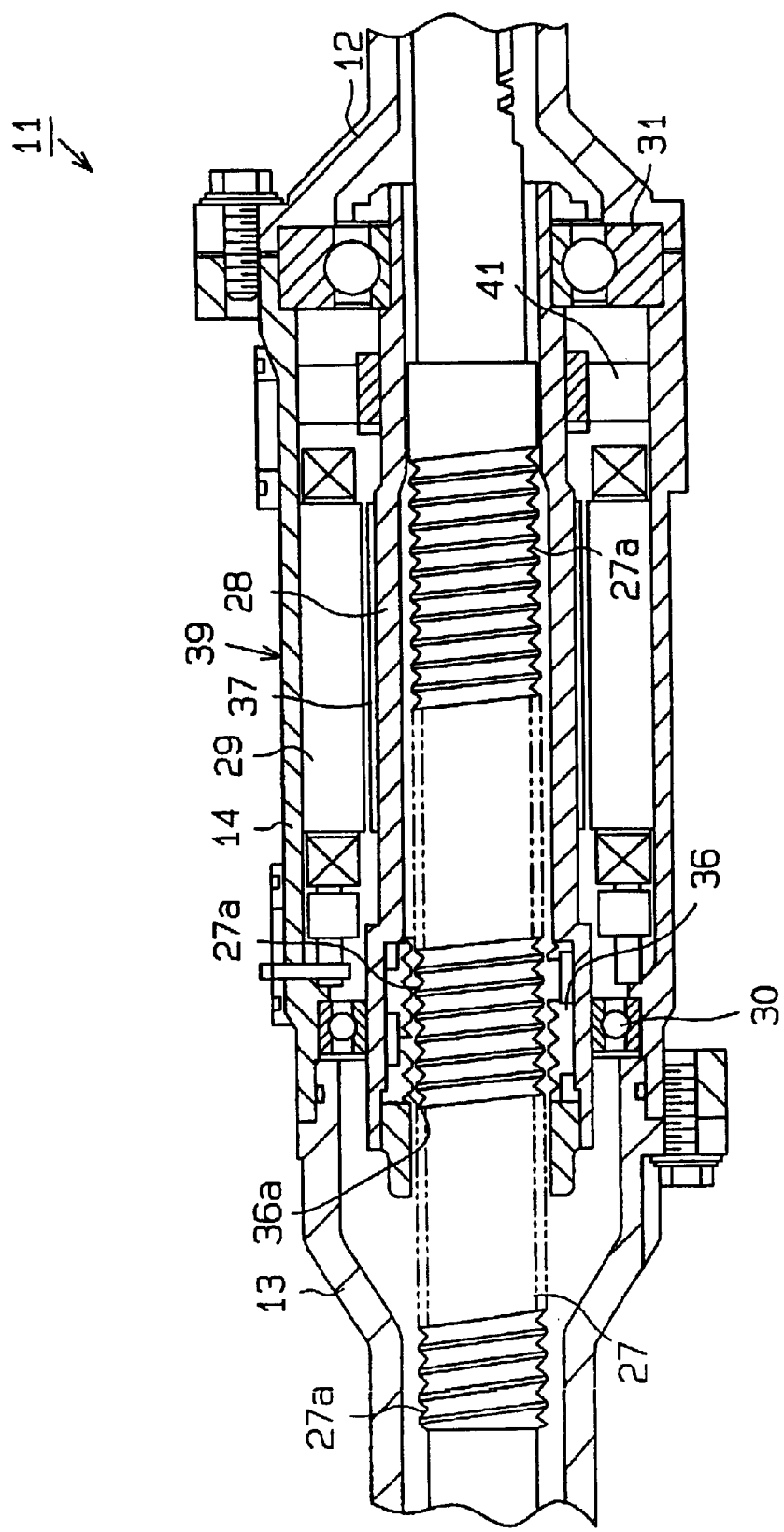
FIG. 5 is a partial cross-sectional view illustrating an electric motor located in the electric power steering apparatus shown in FIG. 1.

As shown in FIGS. 1 and 5, a cylindrical body, which is structured with the first rack housing 12, the second rack housing 13, and the motor housing 14 accommodate a rack shaft 27. The rack shaft 27 axially moves in the cylindrical body but does not rotate relative to the cylindrical body. Left and right front wheels are coupled to the ends of the rack shaft 27 by tie-rods, which are not shown. A rack 27b is formed on the rack shaft 27 as shown in FIG. 2. The rack 27b meshes with the pinion gear 16c of the pinion shaft 16. The pinion gear 16c and the rack 27b form a rack-and-pinion mechanism.

As shown in FIG. 5, a stator 29, about which a coil is wound, is fitted in the inner circumference of the motor housing 14. A hollow cylindrical motor shaft 28 is coaxially located about the rack shaft 27 at the axially middle portion of the rack shaft 27.

A permanent magnet 37 is secured to the outer circumference of the motor shaft 28. The motor shaft 28 is supported by the motor housing 14 via first and second bearings 30, 31.

A ball screw nut 36 is fitted in the end of the motor shaft 28. A spiral ball screw groove 36a is formed on the inner circumferential surface of the ball screw nut 36. A spiral ball screw groove 27a is formed on the outer circumferential surface of the rack shaft 27. Several balls (not shown) are accommodated between and rotate relative to the ball screw groove 27a and the ball screw groove 36a. The ball screw grooves 27a and 36a constitute a ball screw mechanism. The ball screw mechanism converts the normal/reverse rotational torque of the motor shaft 28 to the moving force (assist force) of the rack shaft 27 in the axial direction. The assist force reduces the steering force of the steering wheel 18 via the pinion shaft 16. The motor shaft 28, the stator 29, and other components constitute the electric motor 39. The electric motor 39 is controlled in accordance with the rotation of the steering wheel 18.

A motor resolver 41, which functions as a rotational angle sensor, is located about the motor shaft 28. The motor resolver 41 has substantially the same structure as the first resolver 23. Therefore, only the differences from the first resolver 23 will be described with reference to FIG. 3.

Like the first resolver 23, the motor resolver 41 includes first to fourth yokes 51, 52, 53, and 54, and first to fourth coils 55, 56, 57, and 58. The motor resolver 41 is located between the motor housing 14 and the motor shaft 28.

A method for detecting the rotational angle (hereinafter, referred to as a motor rotational angle) of the motor shaft 28 will now be described.

When the motor shaft 28 is rotated by a certain rotational angle, an alternating current E1 is applied to the first coil 55. A magnetic flux is generated in the first yoke 51 and the second yoke 52 in accordance with the voltage. The magnetic flux induces an alternating current in the second coil 56. Since the second coil 56 is connected to the third coil 57, the magnetic flux also induces an alternating current in the third coil 57. The alternating current generated in the third coil 57 induces alternating currents E2, E3 in the fourth coil 58. The motor rotational angle is obtained by the following equations (a) and (b) based on the alternating current E1 applied to the motor resolver 41 and the alternating currents E2, E3 sent from the fourth coil 58. The motor rotational angle is used for several controls in the electric power steering apparatus 11.

An absolute position detecting apparatus of the steering wheel 18 in the electric power steering apparatus 11 will now be described with reference to FIG. 6.

Figure 6:
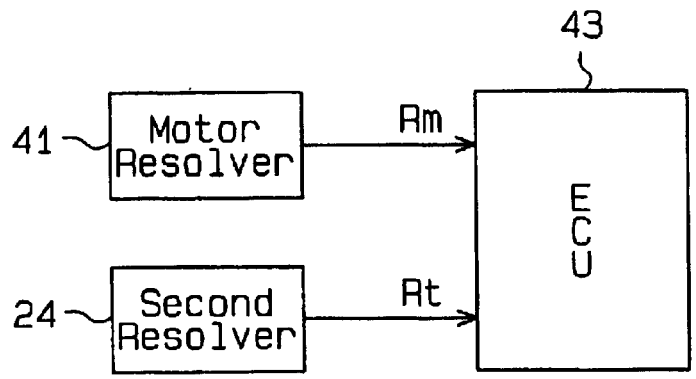
FIG. 6 is a block diagram illustrating the electric configuration of an absolute position detecting apparatus according to the first embodiment.

As shown in FIG. 6, the second resolver 24 of the torque sensor 22 and the motor resolver 41 are electrically connected to a computer, which is an electronic control unit 43 (hereinafter, referred as ECU 43) in the preferred embodiment. The absolute position detecting apparatus includes the second resolver 24, the motor resolver 41, and the ECU 43. The second resolver 24, which functions as a first detector, sends a detection signal Rt (first detection signal) to the ECU 43. The detection signal Rt corresponds to the rotational angle of the output shaft 16b of the pinion shaft 16. The motor resolver 41, which functions as a second detector, sends a detection signal Rm (second detection signal) to the ECU 43. The detection signal Rm corresponds to the rotational angle of the motor shaft 28. The detection signal Rt correspond to the alternating current (E2 or E3) sent from the fourth yoke 54 of the second resolver 24. The detection signal Rm correspond to the alternating current (E2 or E3) sent from the fourth coil 58 of the motor resolver 41. In the preferred embodiment, the detection signals Rt, Rm correspond to the alternating current E2 shown in FIG. 4. The alternating current E3 may also be used as the detection signals Rt, Rm.

The ECU 43 detects the absolute position of the steering wheel 18 based on the detection signals Rt, Rm. The absolute position represents how much the steering wheel 18 is turned from the neutral position. The neutral position is the position of the steering wheel 18 when the front wheels are arranged such that the vehicle travels in a straight line.

A method for detecting the absolute position of the steering wheel 18 will now be described.

In the preferred embodiment, the rotational range of the steering wheel 18 is plus or minus 1.0 rotation (plus or minus 360 degrees). The rotational angle of the steering wheel 18 is zero degrees when the steering wheel 18 is located at the neutral position. The clockwise rotational position from the neutral position is represented by a positive rotational angle and the anti-clockwise rotational position from the neutral position is represented by a negative rotational angle.

FIG. 8(a) is a time chart showing the fluctuation of the voltage level of the detection signal Rt sent from the second resolver 24 with respect to the rotational angle of the steering wheel 18. FIG. 8(b) is a time chart showing the fluctuation of the voltage level of the detection signal Rm sent from the motor resolver 41 with respect to the rotational angle of the steering wheel 18. The detection signals Rt, Rm are periodical saw tooth waveform signals. The peak value (full scale value) of the voltage level of both detection signals Rt, Rm are represented by FS. As the steering wheel 18 is rotated clockwise, the level of each detection signal Rt, Rm changes in a cycle in which the level gradually changes from zero to the peak value FS and then rapidly decreases to zero. In contrast, as the steering wheel 18 is rotated anticlockwise, the level of each detection signal Rt, Rm changes in a cycle in which the level rapidly changes from zero to the peak value FS and then gradually decreases to zero. Portions where the level of the detection signals Rt, Rm gradually change are referred to as gradual change portions and portions where the level of the detection signals Rt, Rm rapidly change are referred to as rapid change portions.

In the preferred embodiment, the number of cycles Tt of the detection signal Rt sent from the second resolver 24 while the steering wheel 18 is rotated once is thirty-two. The number of cycles Tm1 of the detection signal Rm sent from the motor resolver 41 while the motor shaft 28 is rotated once is four.

Also, in the preferred embodiment, the movement distance S by which the rack shaft 27 moves during one rotation of the steering wheel 18 is 50 mm. The movement distance S is referred to as the stroke per rotation S of the rack-and-pinion mechanism. The lead L of the ball screw grooves 27a of the rack shaft 27 and the ball screw grooves 36a of the motor shaft 28 per one rotation is 6.17 mm. Therefore, while the rack shaft 27 moves 50 mm, the motor shaft 28 rotates 8.1 (S/L=50/6.17=8.1) rotation. This indicates that the motor shaft 28 rotates 8.1 rotation during one rotation of the steering wheel 18. Thus, the number of cycles Tm2 of the detection signal Rm sent from the motor resolver 41 during one rotation of the steering wheel 18 is 32.4 (Tm1×8.1=4× 8.1=32.4).

As a result, the difference between the number of cycles Tt of the detection signal Rt sent from the second resolver 24 and the number of cycles Tm2 of the detection signal Rm sent from the motor resolver 41 during one rotation of the steering wheel 18 is 0.4 (32.4−32=0.4). That is, the cycle of the detection signal Rt differs from the cycle of the detection signal Rm.

The difference between the cycle of the detection signal Rt and the cycle of the detection signal Rm is shown in FIG. 8(C) as a cyclic difference I. As shown in FIGS. 8(a), 8(b), and 8(c), the position of the steering wheel 18 when the rapid change portions of the detection signals Rt, Rm coincide with each other is set as the neutral position. In other words, the rotational angle of the steering wheel 18 when the rapid change portions of the detection signals Rt, Rm coincide with each other is set as zero degrees. As the steering wheel 18 is steered clockwise or anticlockwise from the neutral position, the cyclic difference I is accumulated. Therefore, as the rotational angle of the steering wheel 18 separates from zero degrees, the difference between the rotational angles of the steering wheel 18 at the rapid change portions of the detection signal Rt and at the rapid change portions of the detection signal Rm increases.

FIG. 8(c) is a time chart showing the fluctuation of the voltage level difference (Rm−Rt) of the detection signals Rt, Rm with respect to the rotational angle of the steering wheel 18. When the steering wheel 18 is rotated between the rotational angle of zero degrees and plus 360 degrees, the cyclic difference I causes a portion K1 where the voltage level difference (Rm−Rt) rapidly decreases. The portion K is hereinafter referred to as the falling edge. When the steering wheel 18 is rotated between the rotational angle of zero degrees and minus 360 degrees, the cyclic difference I causes a portion K2 where the voltage level difference (Rm−Rt) rapidly increases. The portion K2 is hereinafter referred to as the rising edge. The falling edge K1 and the rising edge K2 appear corresponding to the angle range between the rotational angle of the steering wheel 18 at the rapid change portion of the detection signal Rt and the rotational angle of the steering wheel 18 at the rapid change portion of the detection signal Rm. The width of the falling edge K1 and the rising edge K2 in the direction of the horizontal axis is exaggerated to facilitate understanding.

The inclination of the gradual change portions of the detection signals Rt, Rm differ from each other. As a result, when the steering wheel 18 is rotated from the rotational angle of zero degrees to the rotational angle of plus 360 degrees, the voltage level difference (Rm−Rt) gradually increases from zero except at the falling edge K1. When the steering wheel 18 is rotated from the rotational angle of zero degrees to the rotational angle of minus 360 degrees, the voltage level difference (Rm−Rt) gradually decreases from zero except at the rising edge K2.

When the rotational angle of the steering wheel 18 is plus 360 degrees, the level of the detection signal Rt is zero (see FIG. 8 (a)). The level of the detection signal Rm is obtained by multiplying the peak value FS of the detection signal Rm by the difference in the number of cycles (Tm2−Tt), which is 0.4. Suppose that the peak value FS of the detection signals Rt, Rm is 256. When the rotational angle of the steering wheel 18 is plus 360 degrees, the level of the detection signal Rm is 102.4 (256×0.4=102.4). Therefore, as shown in FIG. 8(c), the voltage level difference (Rm−Rt) when the rotational angle of the steering wheel 18 is plus 360 degrees is 102.4 (102.4−0=102.4). On the other hand, the voltage level difference (Rm−Rt) when the rotational angle of the steering wheel 18 is minus 360 degrees is minus 102.4.

Therefore, when the rotational angle of the steering wheel 18 changes from zero to plus 360 degrees, the voltage level difference (Rm−Rt) gradually (linearly) increases from zero to 102.4 except at the falling edge K1. Also, when the rotational angle of the steering wheel 18 changes from zero degrees to minus 360 degrees, the voltage level difference (Rm−Rt) gradually (linearly) decreases from zero to minus 102.4 except at the rising edge K2.

Hereinafter, the absolute value of the voltage level difference (Rm−Rt) when the rotational angle of the steering wheel 18 is plus or minus 360 degrees is referred to as the criterion difference ΔRs. The criterion difference ΔRs is stored in the ECU 43 in advance and is used for obtaining the absolute position (absolute rotational angle) of the steering wheel 18.

The criterion difference ΔRs corresponds to the variation amount of the level difference (Rm−Rt) per one rotation of the steering wheel 18. In other words, the criterion difference ΔRs corresponds to the information (characteristic information) regarding the variation of the level difference (Rm−Rt), which varies in accordance with the rotation of the steering wheel 18.

That is, the absolute position (absolute rotational angle) θ of the steering wheel 18 is obtained by the following equation (1) based on the current voltage level difference (Rm−Rt) and the criterion difference ΔRs except at positions corresponding to the falling edge K1 and the rising edge K2. As mentioned above, the criterion difference ΔRs is 102.4 and the peak values FS of the detection signals Rt, Rm are 256.

$$\theta = ((Rm-Rt) \times 360)/\Delta Rs \quad (1)$$

The absolute value of the voltage level difference (Rm−Rt) at the falling edge K1 and the rising edge K2 exceeds the criterion difference ΔRs, which is 102.4. Therefore, when the absolute value of the voltage level difference (Rm−Rt) exceeds 102.4 when the steering wheel 18 is within the allowable rotational angle range, which is between minus 360 degrees and plus 360 degrees, it is determined that the steering wheel 18 is at a position corresponding to the falling edge K1 or the rising edge K2.

When the voltage level difference (Rm−Rt) is greater than 102.4, or when the steering wheel 18 is at a position corresponding to the rising edge K2, the absolute position θ of the steering wheel 18 is obtained by the following equation (2). In the equation (2), the transition of the voltage level difference (Rm−Rt) shown in FIG. 8(c) is obtained ignoring the rising edge K2 by subtracting the peak value FS, which is 256, from the voltage level difference (Rm−Rt). In other words, while the steering wheel 18 rotates between zero and minus 360 degrees, the voltage level difference (Rm−Rt) gradually (linearly) changes between zero and minus 102.4.

$$\theta = ((Rm-Rt-FS) \times 360)/\Delta Rs \quad (2)$$

On the other hand, when the voltage level difference (Rm−Rt) is less than minus 102.4, or when the steering wheel 18 is at a position corresponding to the falling edge K1, the absolute position θ of the steering wheel 18 is obtained by the following equation (3). In the equation (3), the transition of the voltage level difference (Rm−Rt) shown in FIG. 8(c) is obtained ignoring the falling edge K1 by adding the peak value FS, which is 256, to the voltage level difference (Rm−Rt). In other words, while the steering wheel 18 rotates between zero to plus 360 degrees, the voltage level difference (Rm−Rt) gradually (linearly) changes between zero and plus 102.4.

$$\theta 32\ ((Rm-Rt+FS) \times 360)/\Delta Rs \quad (3)$$

Figure 7:
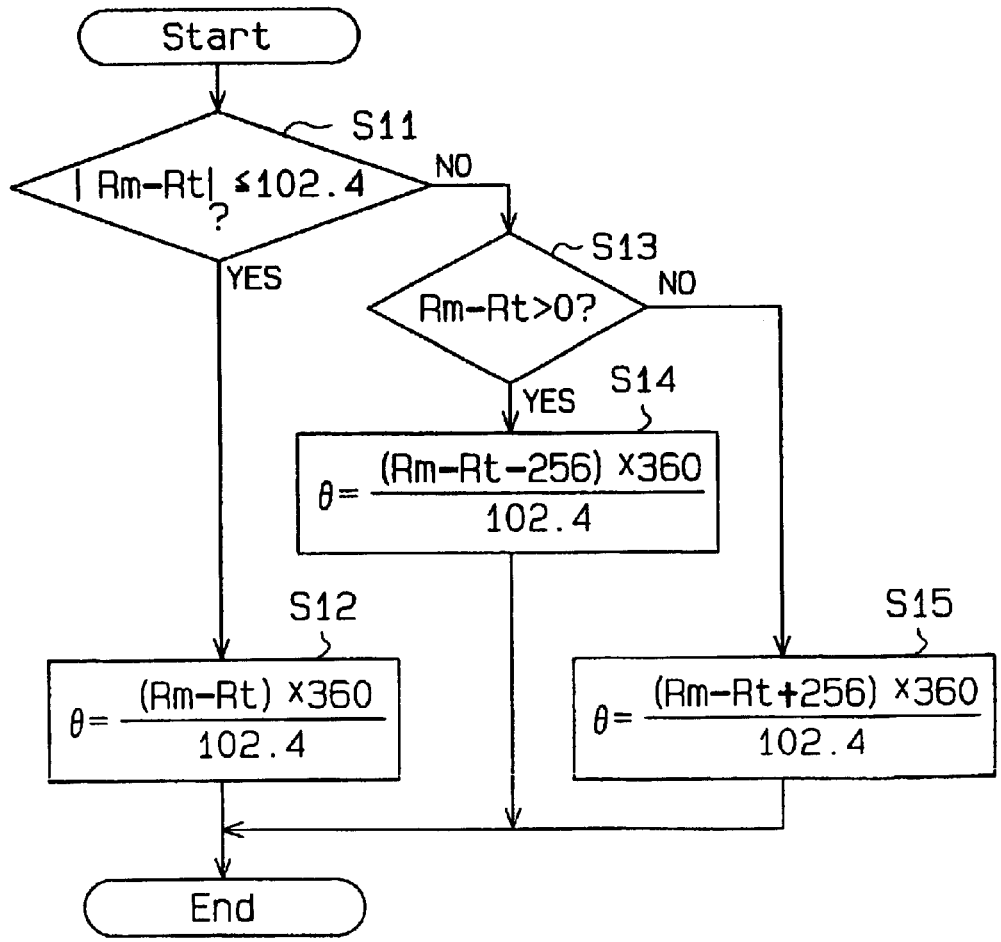
FIG. 7 is a flowchart illustrating the position detecting procedure performed by the absolute position detecting apparatus shown in FIG. 6.

The procedure executed by the ECU 43 to detect the absolute position of the steering wheel 18 will now be described with reference to a flowchart shown in FIG. 7. The routine shown in FIG. 7 is repeated every predetermined time period.

In step S11, the ECU 43 determines whether the absolute value of the voltage level difference (Rm−Rt) is less than or equal to the threshold value, or the criterion difference ΔRs, which is 102.4. If it is determined that the absolute value of the voltage level difference (Rm−Rt) is less than or equal to 102.4, the ECU 43 determines that the value of the voltage level difference (Rm−Rt) is neither the value at the falling edge K1 nor the value at the rising edge K2 and proceeds to step S12. In step S12, the ECU 43 obtains the absolute position θ of the steering wheel 18 using the equation (1).

On the other hand, if it is determined that the absolute value of the voltage level difference (Rm−Rt) is greater than 102.4, the ECU 43 determines that the value of the voltage level difference (Rm−Rt) is one of the values at the falling edge K1 and the rising edge K2 and proceeds to step S13. In step S13, the ECU 43 determines whether the voltage level difference (Rm−Rt) is greater than zero, that is, a positive value. If the voltage level difference (Rm−Rt) is a positive value, the ECU 43 determines that the value of the voltage level difference (Rm−Rt) is the value at the rising edge K2 and proceeds to step S14. In step S14, the ECU 43 obtains the absolute position θ of the steering wheel 18 using the equation (2).

On the other hand, if the voltage level difference (Rm−Rt) is a negative value in step S13, the ECU 43 determines that the value of the voltage level difference (Rm−Rt) is the value at the falling edge K1 and proceeds to step S15. In step S15, the ECU 43 obtains the absolute position θ of the steering wheel 18 using the equation (3).

As described above, the ECU 43 detects the absolute position θ of the steering wheel 18 with reference to the neutral position using one of the equations (1) to (3) based on the detection signal Rt sent from the second resolver 24 and the detection signal Rm sent from the motor resolver 41.

The transition of the voltage level difference (Rm−Rt) shown in FIG. 8(c) is based on the mechanical structure of the electric power steering apparatus 11 according to the preferred embodiment. The transition of the voltage level difference (Rm−Rt) is constantly obtained while the ignition switch of the vehicle is on. Therefore, the absolute position θ of the steering wheel 18 is detected in an early stage immediately after the ignition switch is turned on.

The conventional assist control and the steering wheel return control and the like are performed in a suitable manner based on the detected absolute position θ of the steering wheel 18.

The preferred embodiment provides the following advantages.

(1) The absolute position θ of the steering wheel 18 is detected based on the detection signal Rt sent from the second resolver 24 and the detection signal Rm sent from the motor resolver 41. The second resolver 24 is used for detecting the steering torque generated when the steering wheel 18 is rotated. The motor resolver 41 is used for detecting the rotational angle of the electric motor 39, which is driven in accordance with the rotation of the steering wheel 18. That is, the second resolver 24 and the motor resolver 41 are used as an apparatus for detecting the absolute position θ of the steering wheel 18 in addition to their original functions. Therefore, an additional steering sensor need not be located on the electric power steering apparatus 11. Thus, the absolute position θ is detected in a suitable manner while reducing the cost.

(2) The cyclic difference I between the number of cycles of the detection signal Rt and the detection signal Rm constantly occurs as the characteristic of the electric power steering apparatus 11. The preferred embodiment utilizes the cyclic difference I to detect the absolute position θ of the steering wheel 18. Therefore, the absolute position θ of the steering wheel 18 is detected at an early stage even immediately after the ignition switch is turned on.

(3) As described in the background of the invention, the absolute position of the steering wheel 18 cannot be detected by only using one of the detection signal Rt sent from the second resolver 24 and the detection signal Rm sent from the motor resolver 41. In the preferred embodiment, the absolute position of the steering wheel 18 is accurately and reliably detected using both the detection signal Rt sent from the second resolver 24 and the detection signal Rm sent from the motor resolver 41.

(4) Assume that a detection signal sent from the first resolver 23 corresponding to the input shaft 16a is used instead of the detection signal Rt sent from the torque sensor 22, which is used for detecting the absolute position θ. Since the input shaft 16a is connected to the rack shaft 27 by the elastic member, which is the torsion bar 20, the absolute position θ need to be detected taking into consideration of the twist of the torsion bar 20 that is caused when turning the steering wheel 18. On the other hand, the output shaft 16b of the pinion shaft 16 is connected to the motor shaft 28 without any elastic member. Since the preferred embodiment uses the detection signal sent from the second resolver 24, which corresponds to the output shaft 16b, for detecting the absolute position θ, the absolute position θ is accurately and easily detected.

It should be apparent to those skilled in the art that the present invention may be embodied in many other specific forms without departing from the spirit or scope of the invention. Particularly, it should be understood that the invention may be embodied in the following forms.

In the preferred embodiment, the absolute position θ of the steering wheel 18 is indicated based on the neutral position, which is zero. However, the neutral position may be other than zero degrees.

In the preferred embodiment the allowable rotational range of the steering wheel 18 is restricted to be plus or minus 1.0 rotation (plus or minus 360 degrees). However, the range may be changed as required. For example, the range may be plus or minus 2.0 rotations. In this case, the threshold value used in step S11 of FIG. 7 is changed in accordance with the allowable rotational range of the steering wheel 18.

The peak value (full scale value) FS, the relative stroke S of the rack-and-pinion mechanism, the lead L of the ball screw groove 27a, and the number of cycles Tt, Tm1 of the detection signals Rt, Rm may be changed as required.

Therefore, the present examples and embodiments are to be considered as illustrative and not restrictive and the invention is not to be limited to the details given herein, but may be modified within the scope and equivalence of the appended claims.

What is claimed is:

1. An apparatus for detecting the absolute rotational position of a steering wheel, wherein the steering wheel is coupled to a power steering apparatus, and the power steering apparatus has a motor, which generates an assisting force to reduce the steering force of the steering wheel, and wherein the motor is controlled in accordance with the steering torque of the steering wheel and the rotational angle of the motor, the detecting apparatus comprising:

a first detector, which generates a periodic first detection signal in accordance with rotation of the steering wheel, wherein the first detection signal is used for detecting the steering torque of the steering wheel;

a second detector, which generates a periodic second detection signal in accordance with rotation of the motor, wherein the second detection signal is used for detecting the rotational angle of the motor, wherein the cycle of the second detection signal differs from the cycle of the first detection signal, and wherein a level difference, which is the difference between the level of the first detection signal and the level of the second detection signal, varies in accordance with rotation of the steering wheel; and a computer, wherein the computer in advance stores characteristic information regarding the variation of the level difference, which varies in accordance with rotation of the steering wheel, and wherein the computer calculates the absolute rotational position of the steering wheel based on the current level difference and the characteristic information.

2. The detecting apparatus according to claim 1, wherein each of the first detector and the second detector is a resolver.

3. The detecting apparatus according to claim 1, wherein the power steering apparatus includes:

a first rotary shaft coupled to the steering wheel;

a second rotary shaft coaxially arranged with the first rotary shaft;

a torsion bar coupling the second rotary shaft with the first rotary shaft;

a first resolver, which generates a signal in accordance with rotation of the first rotary shaft; and a second resolver, which generates a signal in accordance with rotation of the second rotary shaft, wherein the steering torque of the steering wheel is obtained based on a signal sent from the first resolver and a signal sent from the second resolver, wherein the second resolver functions as the first detector.

4. The detecting apparatus according to claim 1, wherein the characteristic information includes the variation amount of the level difference per unit rotation of the steering wheel.

5. The detecting apparatus according to claim 1, wherein, except when the steering wheel is located at particular rotational positions, the level difference gradually changes in accordance with rotation of the steering wheel.

6. The detecting apparatus according to claim 5, wherein, when the steering wheel is at a predetermined reference position, the level difference is zero, wherein, except when the steering wheel is located at the particular rotational positions, the level difference gradually increases from zero in accordance with rotation of the steering wheel in one direction from the reference position and gradually decreases from zero in accordance with rotation of the steering wheel in the other direction from the reference position.

7. The detecting apparatus according to claim 6, wherein the characteristic information includes the absolute value of the level difference when the steering wheel is located at a predetermined rotational position that is apart from the reference position.

8. A method for detecting the absolute rotational position of a steering wheel, wherein the steering wheel is coupled to a power steering apparatus, and the power steering apparatus has a motor, which generates an assisting force to reduce the steering force of the steering wheel, wherein the motor is controlled in accordance with the steering torque of the steering wheel and the rotational angle of the motor, the method comprising:

generating a periodic first detection signal in accordance with rotation of the steering wheel, wherein the first detection signal is used for detecting the steering torque of the steering wheel;

generating a periodic second detection signal in accordance with rotation of the motor, wherein the second detection signal is used for detecting the rotational angle of the motor, wherein the cycle of the second detection signal differs from the cycle of the first detection signal, and wherein a level difference, which is the difference between the level of the first detection signal and the level of the second detection signal, varies in accordance with rotation of the steering wheel; and computing the absolute rotational position of the steering wheel based on characteristic information regarding the variation of the level difference, which varies in accordance with rotation of the steering wheel, and the current level difference.

* * * * *